Jan. 7, 1941.  H. T. GATES  2,228,109
DUPLICATING MACHINE
Filed July 8, 1939  5 Sheets-Sheet 2

INVENTOR.
Harlow T. Gates
BY Zabel, Carlson, Fritzbaugh and Wiles
ATTORNEYS.

Jan. 7, 1941.   H. T. GATES   2,228,109
DUPLICATING MACHINE
Filed July 8, 1939   5 Sheets-Sheet 4

INVENTOR.
*Harlow T. Gates*
BY *Zabel, Carlson, Fritzlaugh and Wells*
ATTORNEYS.

Patented Jan. 7, 1941

2,228,109

UNITED STATES PATENT OFFICE 2,228,109

DUPLICATING MACHINE

Harlow T. Gates, Webster Groves, Mo., assignor to Ditto, Incorporated, Chicago, Ill., a corporation of West Virginia Application July 8, 1939, Serial No. 283,430

13 Claims. (Cl. 101—133)

My invention relates to duplicating machines of the hectograph type and it has for its object to provide in a machine of this type a construction by which a plurality of sheets assembled in overlapping unit form may be applied easily and quickly to the duplicating pad of the machine with the lines of copy from the several master sheets arranged in regularly spaced relation to each other longitudinally of the pad, and by which a plurality of copy sheets assembled likewise in overlapping unit form may be applied easily and quickly to the duplicating pad with the copy subject matter thereon so as to take impression copies of the several lines of the subject matter on the respective copy sheets by a single impression operation, and to provide in the same machine a construction comprising a carriage or equivalent device by which alternatively individual cards or sheets may be moved by successive impression operations of the machine into impression relationship with different lines of said subject matter on the pad.

The preferred form of the machine for carrying out the objects of my invention is of the general type illustrated and claimed in the application of Hubert Jagger, Serial No. 237,169, filed October 27, 1938, in which means is provided for carrying pay roll checks, pay envelopes, or individual personal record cards one at a time on a carriage in adjusted position thereon for placing a series of such parts successively in impression relationship with the successive lines of the subject matter on the duplicating pad. My invention comprises arranging a plurality of master sheets into a unit form of assembly with the several sheets overlapping each other so as to bring the line or lines of subject matter on each master sheet into the desired spaced relation to the line or lines of subject matter on the adjacent master sheet corresponding to the spacing between lines for which the machine is arranged. My invention comprises further the provision of margin bar means on the bed of the machine for controlling the positioning of the master sheet assembly on the duplicating pad so as to cause the margin bars of the carriage to be effective later with respect to the operation of bringing the copy sheets of the several forms shown into the proper line positions for receiving the required impressions from the duplicating pad.

My invention comprises further arranging a plurality of copy sheets into a unit form of assembly with the several sheets overlapping each other so as to bring the copy face portions of the several copy sheets into such spaced relation to each other and into such spaced relation to the margins of the unit assembly as to enable the operator to bring the unit assembly into the desired position on the duplicating pad by reference to the same margin bar means employed for controlling the position of the master sheet assembly on the duplicating pad.

It is another object of my invention to improve apparatus of this type in sundry details hereinafter pointed out. The preferred means by which I have accomplished my several objects are illustrated in the accompanying drawings, in which—

Referring now to Figs. 1 to 8 inclusive, the machine comprises a frame 25 supported from a cabinet 26. In the arrangement shown, the frame at each side of the machine comprises two frame bars 27 and 28 having a longitudinally extending slot 29 between the bars at each side of the machine. Underneath the bars 27, there is provided a transversely extending frame member 30 which has upwardly extending arm portions 31 at its ends in slightly spaced relation to the side faces of the frame bars 27, as is clearly shown in Fig. 4, only one end portion of the frame bar 30 being shown. Upon the upper ends of the arms 31, I have provided a transverse frame member 32, the frame members 30, 31 and 32 constituting the principal carrying parts which are adapted to be moved back and forth along the frame 25, such parts constituting the framework of the carriage of the machine.

The means for mounting the carriage movably upon the frame 25 comprises a bar 33 mounted longitudinally of the carriage at each side thereof, such bar being held by means of bearing balls 34 in anti-friction relationship with a channel bar 35 carried by the frame member 27 at each side of the machine.

Between the frame bars 27, there is mounted a bed plate 36 of any approved form over which a duplicating pad or band 37 is stretched, such duplicating pad being preferably of the type having a gelatinized face so as to be capable of receiving the ink from a master sheet applied thereto. In machines of this type heretofore in use, means have been provided for holding the duplicating pad 37 in operative position and for shifting it as may be desired with respect to the bed. Inasmuch as this holding and adjusting means forms in and of itself no part of the present invention, it is believed to be unnecessary to describe it further in detail.

Figures 1, 18:
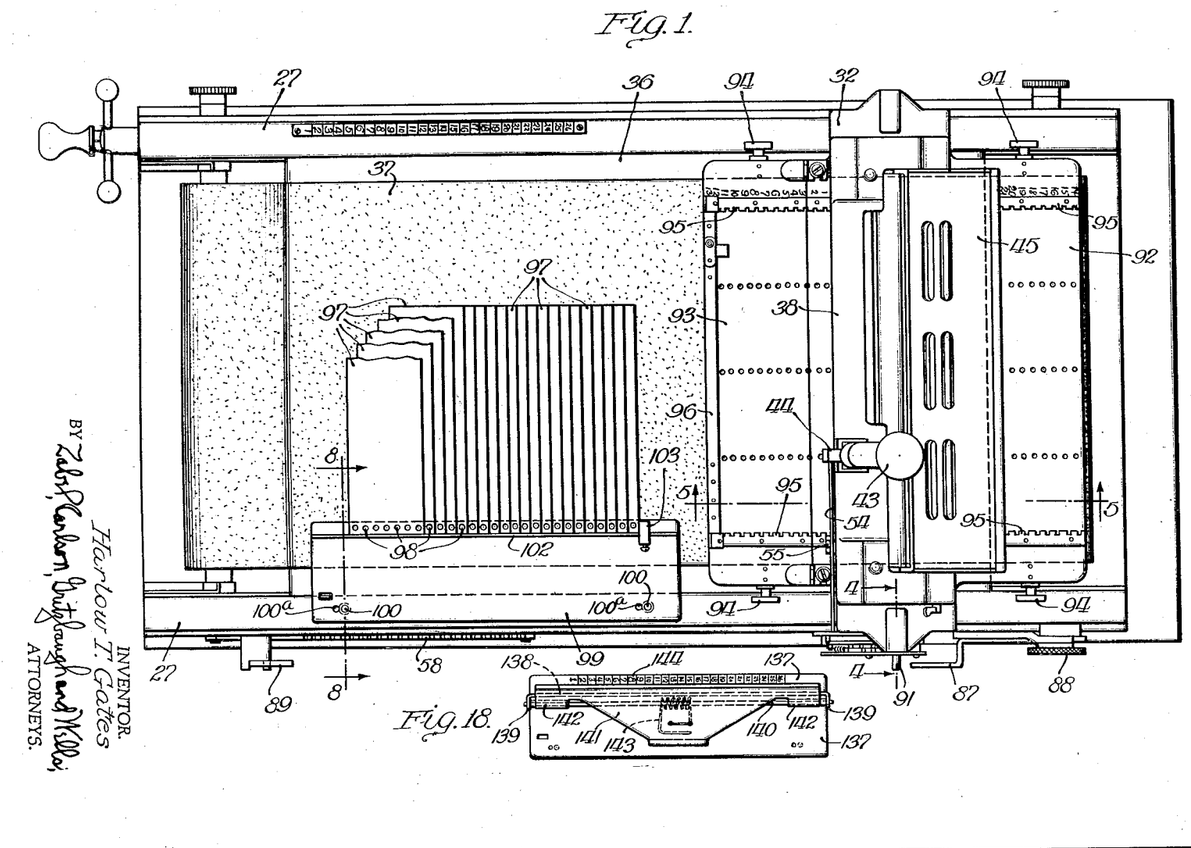
Fig. 1 is a top plan view of a hectograph duplicating machine of the pay roll type, with the carriage moved to the limit of its motion backwardly, and with my improved side margin bar means in position at the front end portion of the bed, together with a plurality of copy sheets arranged in overlapping unit form so as to be positioned by said margin bar means for application to the duplicating pad.
Fig. 18 is a top plan view of still another modified form of side bar mechanism.

Upon the frame plate 32, there is mounted a housing 38 of any approved form extending across the machine from one side to the other, as is clearly shown in Fig. 1. Within the housing 38, there is mounted a platen roller 39 so as to be free to rotate and so as to be movable vertically toward and from the duplicating pad 37. In the arrangement shown, the platen roller 39 is mounted by means of a shaft 40 journaled at its ends in the arms of a yoke 41 which is pivotally mounted upon a shaft 42 journaled at its ends in the end walls of the housing 38. For turning the shaft 42 so as to swing the yoke 41 and the platen roller 39 vertically toward and from the duplicating pad, a handle 43 is mounted upon the shaft at an intermediate point therealong, such handle being provided with a forwardly extending lug 44 thereon (see Fig. 5).

Figure 5:
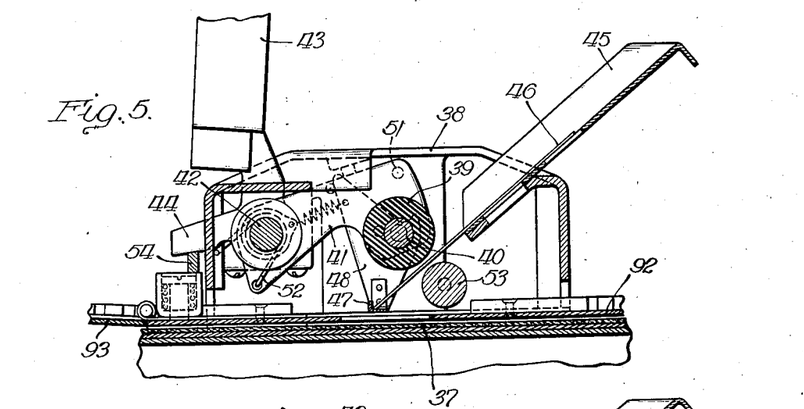
Fig. 5 is a vertical sectional view taken substantially at the line 5—5 of Fig. 1.
Figure 6:
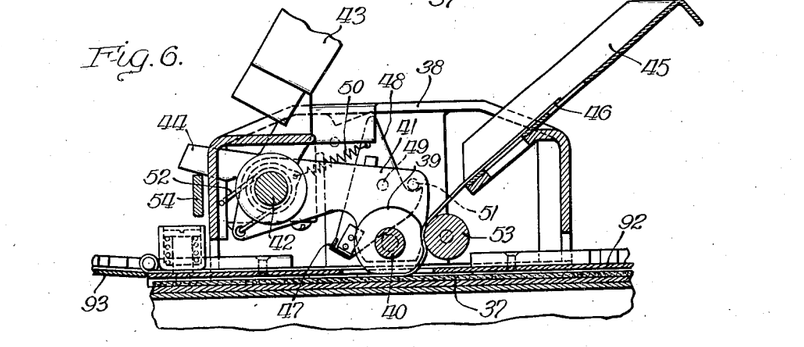
Fig. 6 is a view similar to Fig. 5 but showing a changed position of the parts.

The arrangement is such that when the lever or handle 43 is standing in its normal position as shown in Fig. 5 the platen roller 39 is held in raised position, the roller 39 being given an operative stroke downwardly toward the duplicating pad upon a backward stroke of the handle 43 into the position as shown in Fig. 6.

Means is provided at the rear edge portion of the housing 38 for supporting a copy sheet, such means comprising an obliquely disposed tray or table 45 along which a copy sheet such as the sheet 46 as shown in Fig. 5 is slidable into engagement with a margin bar 47. In the arrangement shown, the margin bar 47 is movably mounted in position by means of brackets 48 which in turn are pivotally mounted upon pins or rivets 49 carried by the end walls of the housing 38 (see Fig. 6). Coiled springs 50 are connected at their rear ends with the brackets 48 and at their forward ends with the shaft 42, serving normally to hold the brackets in the position as shown in Fig. 5 with the margin bar 47 in substantial alignment with the tray 45 so as normally to engage the forward edge of a copy sheet 46 carried by the tray. The arms of the yoke 41 are provided with pins 51 in position to engage the brackets 48 upon downward movement of the yoke so as to swing the brackets and the margin bar 47 in clockwise direction from the position as shown in Fig. 5 to the position as shown in Fig. 6 against the action of the springs 50 when the handle 43 is moved backwardly to the position as shown in said Fig. 6. A spring 52 is provided upon the shaft 42 so as to engage the yoke 41 serving normally to hold the lever or handle 43 in substantially vertical position as shown in Fig. 5, with the platen roller 39 in raised position. A pressure roller 53 is journaled in position adjacent to the platen roller 39 so as to be adapted by cooperation with the platen roller to grip a copy sheet such as the sheet 46 when pushed downwardly by the platen roller as shown in Fig. 6.

Upon the front face of the housing 38, a transversely extending lever 54 is pivotally mounted by means of a bolt 55 (see Fig. 3), such lever 54 having its inner end positioned underneath the lug 44 carried by the handle or lever 43. The arrangement is such that upon forward movement of the lever 43 from the position as shown in Fig. 6 to the normal position as shown in Fig. 5, the lever 54 is swung in counterclockwise direction in Fig. 3 for raising the outer end of said lever 54 so as to effect a movement of associated means as hereinafter described.

Figure 2:
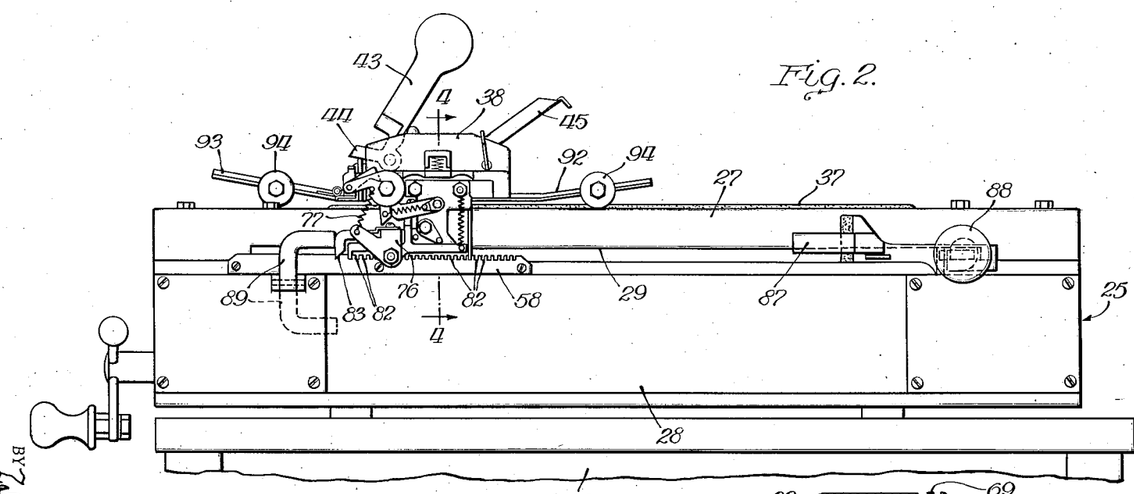
Fig. 2 is a side view of the machine as shown in Fig. 1, but with the side margin bar means removed and with the carriage moved toward the front.
Figure 3:
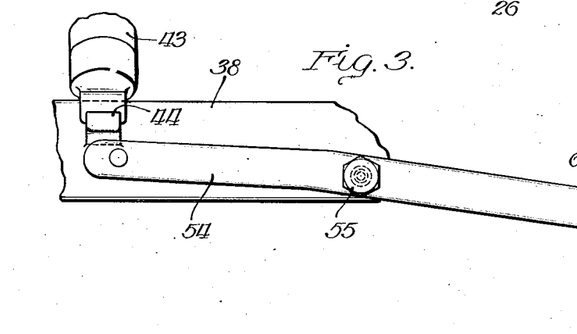
Fig. 3 is a diagrammatic view showing fragmentary parts of the framework and operating means as seen from the left in Fig. 2.
Figure 4:
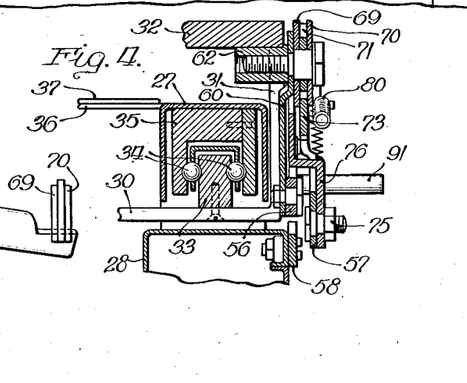
Fig. 4 is a vertical sectional view taken substantially at the line 4—4 of Figs. 1 and 2.
Figure 7:
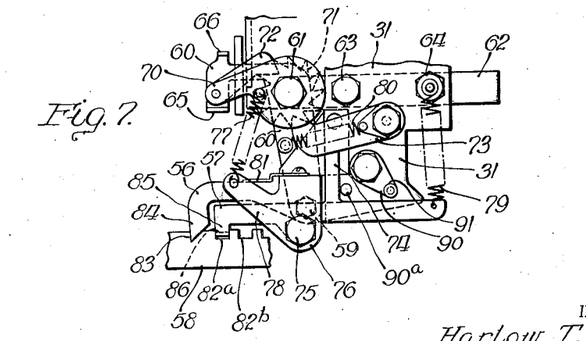
Fig. 7 is a diagrammatic view showing on an enlarged scale certain of the framework and operating parts as seen in Fig. 2, with some of the parts broken away and with other parts omitted.

Means is provided for giving the carriage a step by step movement toward the right in Figs. 2 and 7, comprising a pair of levers 56 and 57 which have releasable engagement with a rack bar 58 carried by the frame 25. The lever 56, as is best shown in Fig. 7, is pivotally connected by means of a pin or rivet 59 at an intermediate point with a bellcrank lever 60 which is pivotally mounted upon a pin or bolt 61 carried by a longitudinally extending bar 62 mounted upon the frame bar 31 by means of machine screws 63 and 64. At the forward end of the forwardly extending arm of the bellcrank lever 60, two lugs 65 and 66 are provided in vertically spaced relation to each other.

Upon the pin or bolt 61 adjacent to the bellcrank lever 60, there are provided two short arms or levers 69 and 70 with a ratchet wheel 71 mounted therebetween, all of such parts being loosely mounted upon said bolt 61. Between the free forward ends of the levers 69 and 70, there is mounted a pawl 72 having its rear end in engagement with the rachet wheel 71 so that upon movement of the arms or levers 69 and 70 in clockwise direction in Fig. 7 the ratchet wheel is given a corresponding rotary movement. A second pawl 73 is likewise mounted so as to engage the ratchet wheel 71, such pawl 73 being pivotally mounted upon the arm 31 of the frame member 30. The pawl 73 normally is supported in full operative engagement with the ratchet wheel 71 by means of an arm 74 rising from the lever 57. The lever 57 is pivotally mounted by means of a bolt 75 upon a bracket 76 carried by the frame arm 31.

In the arrangement shown, the lever 70 is connected by a coiled spring 77 with an arm 78 carried by the bracket 76 so as normally to hold the levers 69 and 70 in lowered position in engagement with the lug 65 of the bellcrank lever 60. The rear end of the lever 57 is connected by means of a spring 79 with the machine screw 64 directly above so as to hold the lever 57 normally turned to the limit of its movement in counterclockwise direction in Fig. 7. A spring 80 connected between the downwardly extending arm of the bellcrank lever 60 and a suitable portion of the framework serves normally to hold the bellcrank lever turned to the limit of its movement in counterclockwise direction in said Fig. 7. A flat spring 81 carried by the bracket 76 and bearing on the lever 56 normally holds such lever 56 turned to the limit of its motion in counterclockwise direction in said Fig. 7.

As is clearly shown in Figs. 2 and 7, the rack bar 58 is provided with a plurality of substantially square notches 82 arranged in spaced relation to each other therealong, together with a substantially V-shaped notch 83 in its forward end. For convenience of reference thereto, the first two of the square notches at the forward end of the bar 58 are designated as 82a and 82b respectively, in said Fig. 7. The forward end portions of the levers 56 and 57 are turned downwardly to provide arms or lugs 84 and 85 thereon, the lug 84 being shaped to conform to the shape of the notch 83. The lower end portion of the lug 85 of the lever 57 is turned into horizontal position so as to provide an engaging portion 86 in position to engage one or another of the notches 82 in the rack bar 58.

With the parts in the arrangement as shown in Fig. 5 with the handle or lever 43 in its normal substantially upright position, and with the lug 86 of the lever 57 engaging the notch 82a of the rack bar 58, the lever 54 will be standing with its inner end depressed and its outer end raised so as to hold the arms 69 and 70 in their uppermost position, such arms in this position serving by engagement with the lug 66 on the bellcrank lever 60 to hold the lever 60 swung backwardly to the limit of its motion about the pivot pin 59. In this position of the parts, the lug 84 of the lever 56 will be standing in engagement with the top face of the rack bar 58 at the left of the notch 83.

Under these conditions, a copy sheet 46 will be placed face downwardly upon the obliquely disposed supporting tray 45 and will be moved downwardly into engagement with the margin bar 47, whereupon the machine is ready for an operative stroke of the handle or lever 43 backwardly for printing data from the duplicating pad 37 upon the copy sheet. Upon the initial movement of the lever 43 backwardly, the lever 54 is swung in clockwise direction in Fig. 3 for permitting the spring 77 to swing the arms 69 and 70 downwardly and to swing the bellcrank lever 60 in counterclockwise direction in Fig. 7 for carrying the lever 56 into position for permitting the lug 84 to engage the notch 83 of the rack bar 58 under the influence of the flat spring 81. Upon the continued movement of the lever 43 backwardly, the platen roller 39 is brought into operative engagement with the copy sheet 46 which is pressed downwardly by the platen roller into operative engagement with the duplicating pad 37 for a transfer of the first line of printing from the pad 37 to the copy sheet.

After the proper pressure has been applied upon the copy sheet 46, the lever 43 is again moved manually to its normal forward position. The arrangement of the parts is such that upon the upward movement of the platen roller 39 such roller cooperates with the pressure roller 53 for stripping the copy sheet from the gelatin pad 37. At the same time, the lug 44 by engagement with the lever 54 causes the outer end of said lever 54 to move upwardly for raising the arms 69 and 70 so as to give the pawl 72 an operative stroke for rotating the ratchet wheel 71 in clockwise direction in Fig. 7. This rotation of the ratchet wheel 71 serves to force the pawl 73 downwardly by a camming action thereon so as to press downwardly on the arm 74 carried by the lever 57 for causing such lever 57 to swing in clockwise direction in Fig. 7 out of engagement with the rack bar 58 against the action of the spring 79. As the upward swinging movement of the arms 69 and 70 continues, such arms are brought into engagement with the lug 66 carried by the bellcrank lever 60, after which the still further continued upward swinging of the arms causes the bellcrank lever to swing backwardly about the pivot pin 59 so as to carry the pin 61 and the carriage upon which such pin is mounted toward the right in Fig. 7 for bringing the lug 86 of the lever 57 into position directly above the notch 82b of the rack bar 58. The arrangement is such that at the time when the lug 86 comes opposite to said notch 82b in the rack bar, the ratchet wheel 71 in its rotary movement reaches such a position that the pawl 73 clears the engaged tooth of the ratchet wheel so as to permit the spring 79 to swing the lever 56 in counterclockwise direction in Fig. 7 for bringing the lug 86 into engagement with said notch 82b and for bringing the pawl 73 into engagement with the next adjacent tooth of the ratchet wheel.

At the end of the step of operation as above described, the handle or lever 43 will be again in substantially upright position, with the lever 57 engaging the notch 82b of the rack bar 58, and with the downwardly projecting lug 84 of the lever 56 engaging the notch 83, the bellcrank lever 60 being held then against a return swinging movement to the position as shown in Fig. 7 by the lever 54 which continues to hold the arms 69 and 70 at this time in their uppermost position. Upon the next subsequent stroke of the handle or lever 43 backwardly after the insertion of a new copy sheet upon the tray 45, the arms 69 and 70 are moved downwardly again by the spring 77 as above described, such spring 77 serving also to move the bellcrank lever 60 in counterclockwise direction about the pin 61 to the position as shown in said Fig. 7, such counterclockwise movement of the lever 60 serving to shift the lever 56 from its engagement with the notch 83 to engagement with the notch 82a.

As is clearly shown in Fig. 2, the frame bar 27 at the near side of the machine is provided with a forwardly projecting lug 87 which is held adjustably in position, in the arrangement shown, by a mechanism comprising a set screw 88. At the forward end of the machine, a bracket 89 is provided, pivotally mounted upon a horizontal axis so as to be moved into and out of position in alignment with the lug 87, such bracket in the arrangement shown being in the form of an angle bar comprising a vertically extending arm by which the bracket is swingingly mounted in position and a longitudinally extending arm fixedly mounted on the end of the vertically disposed arm.

Upon the frame member 31 of the carriage, there is mounted an arm or lever 90 adapted to swing backwardly and forwardly about the transverse horizontal axis and provided with a pin 91 at its end extending transversely of the machine into position between the lug 87 and the bracket 89. The arrangement is such that, upon backward movement of the carriage toward the right in Fig. 2 to the limit of its movement, the pin 91 is brought into engagement with the lug 87 so as to swing the lever 90 toward the left in Fig. 2 into engagement with a stop pin 90a carried by the carriage frame member 31. In this movement of the lever 90, the pin 91 pushes downwardly on the levers 56 and 57 at their rear end portions so as to lift the forward ends of said levers out of engagement with the rack bar 58 against the action of the springs 81 and 79. Inasmuch as the lever 90 and the pin 91 in their movement toward the left in Fig. 2 by contact with the lug 87 as above described move into past-center position with respect to the axis of said lever 90, the levers 56 and 57 are of course retained in their inoperative position until such lever 90 is swung again toward the right into its normal position as shown in Fig. 7. The arrangement is such that, when the carriage is moved to the limit of its motion toward the left in said Fig. 7, with the bracket 89 in its operative raised position as shown in solid lines, the bracket 89 engages the pin 91 so as to swing the lever 90 again into its normal position as shown in Fig. 2.

When the carriage has been moved to the limit of its motion toward the left in Fig. 2 and has then been returned toward the right for starting a duplication operation, the lever 57 is held out of engagement with the V-shaped notch 83 but is permitted to drop into engagement with the first square notch 82a at the left so as to stop the backward movement of the carriage. Under these circumstances, the lever 56 stands in position with its lug 84 engaging the top face of the rack bar 58 at the left of the notch 83, the lever 56 being adapted to remain in this position until the bellcrank lever 60 is swung in counter clockwise direction in Fig. 7 into the position as there shown, which movement of the bellcrank lever takes place upon the next succeeding movement of the handle or lever 43 backwardly into the position as shown in Fig. 6. This movement is timed to occur at about the time when the platen roller 39 reaches its lowermost position.

It will be understood that the lever 90 may be moved manually, independently of the action of the lug 87 and the bracket 89, into its operative position in which it holds the levers 56 and 57 out of engagement with the rack bar 58. It will be understood also that when the lever 90 is in its forward operative position, with the bracket 89 swung downwardly out of its operative position, the carriage is then free to move back and forth to the limit of its motion in either direction so as to be capable then of being employed like any ordinary hectograph duplicating machine independently of any step by step forwarding movement of the carriage. It will be understood further that with the bracket 89 swung upwardly into operative position, the carriage can be set at any desired operative position along the rack bar 58, this being effected by a manual manipulation of the levers 56 and 57 through the medium of the lever 90 and the pin 91.

In the machine as shown by my drawings, a tray or table 92 is provided on the carriage, having a forward extension 93 pivotally mounted thereon, such tray means having supporting wheels or rollers 94 mounted thereon in position to run on the side bars of the frame of the machine. As is clearly shown in Fig. 1, the tray is provided with notched bars 95 along its sides, adapted to hold a margin bar 96 adjustably in position for controlling the positioning of a copy sheet on the tray.

With the machine as above described, I contemplate using a plurality of master sheets arranged in overlapping relation to each other as shown in Fig. 1. The assembly of master sheets as there shown comprises a plurality of sheets 97 each in the form of a fairly narrow strip, and each provided with a plurality of openings 98 in one end portion for enabling the sheets to be assembled by the use of any approved form of peg-board or the like such as is disclosed by the application of Joseph H. Tathwell, Serial No. 215,770, filed June 25, 1938. After the several sheets are arranged carefully in equally spaced overlapping relation as shown by the use of the peg-board, a suitable form of clamp is applied to the sheets, as is well understood in the art, and such sheets are placed face downwardly on the duplicating pad 37 with the hectograph ink entries thereon exposed on the edge portions of the several sheets. Such assembly of master sheets is positioned as a unit on the duplicating pad by reference to my improved margin bar means as shown in the drawings of this application.

One preferred form of the device comprises a sheet metal plate 99 having pins 100 mounted thereon at its opposite end portions adapted to have snug releasable engagement with openings 101 in the frame bars 27. Adjacent to the pins 100, I have provided openings 100a through the plate through which the operator may look for enabling him conveniently to insert the pins 100 through the openings 101.

Figure 8:
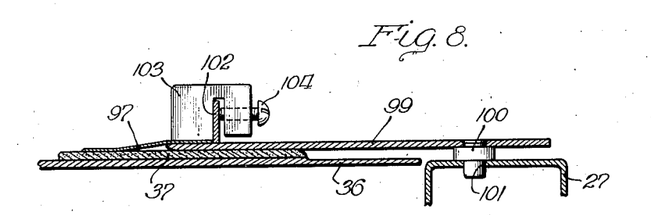
Fig. 8 is a vertical cross sectional view taken substantially at the line 8—8 of Fig. 3.

As is clearly shown in Fig. 8, the plate 99 extends into position over the duplicating pad 37, being provided at its inner edge portion with an upstanding plate 102 positioned above the pad and secured in any suitable manner in position so as to serve as a stop against which the outer edge of the assembly of master sheets can be positioned. Upon the upstanding plate 102, I have provided a margin bar device 103 in the form of a grooved block adapted to be tightened in any adjusted position along the plate 102 by means of a set screw 104. With the block 103 set in the desired position, the assembly of sheets can be placed in position with its inner edge engaging the block, the plate 102 and the block 103 serving thus for positioning the assembly of sheets with all due accuracy on the duplicating pad. After the assembly has been pressed solidly downwardly on the pad, the margin bar means is to be lifted off the machine, leaving a small outer edge portion of the sheet unit free from the gelatin surface so as to be capable of being stripped readily from the pad.

The arrangement of the master sheet assembly comprising the several master sheets 97 is such that the spacing between the successive lines of copy subject matter on said sheets corresponds accurately with the regular spacing of the step by step movement of the carriage of the machine under the control of the rack bar 58, with the result that the copy applied to the duplicating pad 37 from the assembly sheets 97 can be taken off easily and quickly on individual copy sheets by the use of the carriage with such copy located accurately at the desired points on the copy sheets. In this way, the copy from the duplicating pad can be applied to individual record cards, a line to each card, by successive impression operations in the manner fully described in said prior Jagger application. If desired, a plurality of copy sheets can be arranged in overlapping relation to each other by the use of the same pegboard as is used for the arrangement of the master sheets, the spacing of the copy sheets under such circumstances corresponding precisely with the spacing of the master sheets, and accordingly corresponding precisely with the spacing of the lines of copy on the duplicating pad. With such an assembly of copy sheets positioned on the duplicating pad by reference to the margin bar means 102 and 103 in the same adjustment as was in effect for the application of the master sheet assembly, the work of making a complete quota of copy sheets each bearing a single line of the subject matter applied to the duplicating pad from a like number of master sheets can be effected easily and quickly at a single operation. If desired, a plurality of copy sheets 105 such as the check shown in Fig. 9 can be connected together in unit assembly form by means of an adhesive or in any other suitable manner making possible their easy separation from each other (see Fig. 10) whereby an assembly of the copy sheets can be applied for making the desired plurality of copies without the necessity for the use of a peg-board. In this manner the pay checks corresponding to a complete page of a pay roll can be made up very quickly and easily by any operator of ordinary skill and intelligence.

Referring now to Figs. 10 to 13 inclusive, which show a modified form of margin bar means, 106 indicates a plate corresponding to the plate 99, such plate 106 being provided with transversely disposed slots 107 at opposite end portions thereof. The plate 106 is secured in position upon the frame bar 27 at one side of the machine by means of pins 108 engaging the openings 101 in said frame bar 27, such pins 108 being positioned in the slots 107 and having thumb nuts 109 adjustably secured by means of screw threads upon the upper end portions of the pins. In the arrangement shown, the pins 108 are provided with collars 110 fixedly mounted thereon so as to act as spacing blocks between the frame bar 27 and the outer edge of the plate 106. The upper face of the collar 110 of each of the pins is provided with upwardly extending lugs 111 adapted to engage the slots 107 for holding the pins 108 against rotary movement with respect to the plate 106. The arrangement is such that the pins are adapted to be tightened securely against the plate 106 through the medium of the nuts 109 for holding the plate in adjusted position with respect to the pins. A lug 112 (see Fig. 12) is provided on the frame bar 27 serving as an auxiliary support for the plate 106.

At the inner edge of the plate 106, I have provided an upstanding plate member 113 secured in position by means of an angle 114, the angle being preferably secured to both of the plates 106 and 113 by spot welding. Upon the upstanding plates 113 and 114, I have provided a margin bar block 115 corresponding in both structure and function with the block 103 above described. By the use of the plate 106, which is adjustable transversely of the machine, a unit assembly of checks or other copy sheets 105 can be readily placed in position as above described in exact correspondence with the position in which a similar set of master sheets has initially been positioned for producing copy upon the duplicating pad 37.

Figure 14:
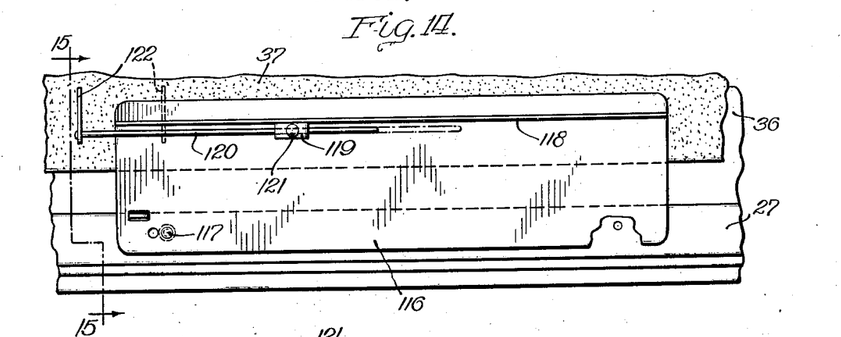
Fig. 14 is a top plan view of a portion of the machine provided with a modified form of side margin bar means.
Figure 15:
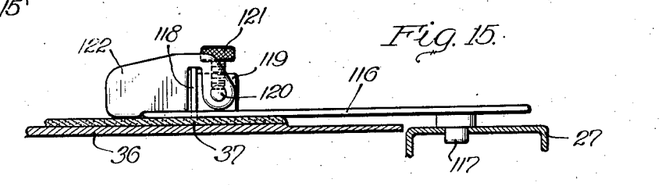
Fig. 15 is a vertical cross sectional view taken on an enlarged scale at the line 15—15 of Fig. 14.

In the arrangement shown in Figs. 14 and 15, a modified form of margin bar means is employed comprising a plate 116 held in position by means of pins 117 corresponding to the pins 100 of the arrangement shown in Figs. 1 and 8. At its inner edge, the plate 116 is provided with an upstanding plate or flange 118 against which the outer edges of the unit assembled sheets are adapted to be positioned. At an intermediate point along the plates 116 and 118, I have provided a block 119 fixedly mounted in position and having a horizontally disposed opening therethrough for the reception of a slide rod 120 which is adapted to be held adjustably in position by means of a set screw 121 mounted by means of screw threads in the block 119. Upon its forward end, the slide rod 120 is provided with a transversely disposed plate 122 against which the front margin of a unit assembly of sheets is adapted to be placed for positioning the assembly of sheets at the desired point upon the duplicating pad 37.

Figures 12, 13, 16:
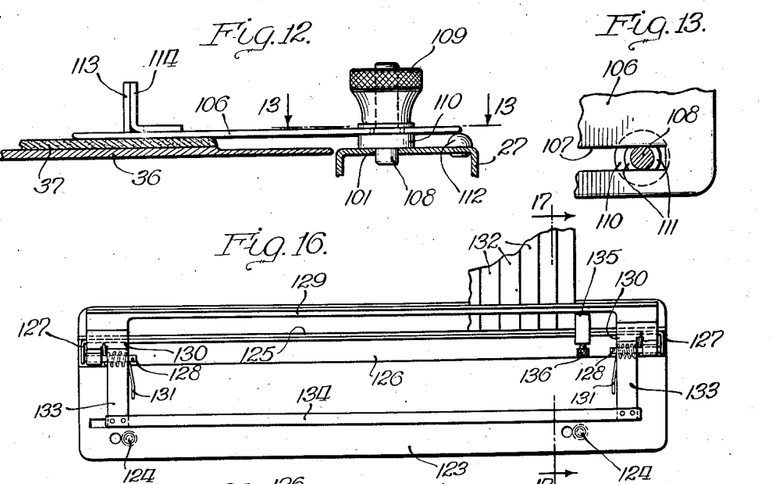
Fig. 12 is a vertical cross sectional view on an enlarged scale taken substantially at the line 12—12 of Fig. 10, but with the bar in adjusted position.
Fig. 13 is an enlarged detail view, being substantially a horizontal section taken at the line 13—13 of Fig. 12.
Fig. 16 is a top plan view of another modified form of side bar mechanism, and showing a plurality of sheets in connection therewith.
Figure 17:
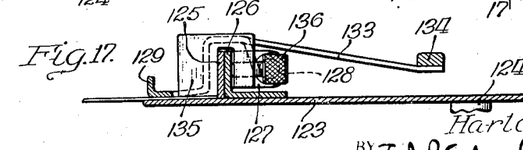
Fig. 17 is a horizontal sectional view taken on an enlarged scale at the line 17—17 of Fig. 16.

In the arrangement shown in Figs. 16 and 17, a plate 123 is employed held in position by means of pins 124. The plate 123 is provided with an upstanding plate or flange 125 held in position by means of an angle bar 126. At its end portions, the vertically disposed plate portion of the angle bar 126 is provided with outwardly extending arms 127 which are provided with longitudinally extending pins 128 rigidly mounted in position therein for pivotally supporting a clamping bar 129 journaled upon said pins by means of bearings provided by mounting arms 130. Coiled springs 131 are provided upon the pins 128 serving normally to hold the bar 129 pressed downwardly toward the edge of the plate 123 (see Fig. 17) for holding an assembly of sheets 132 in position upon the plate 123. For moving the clamping bar 129 upwardly against the action of the springs 131, I have provided arms 133 formed integrally with the clamping bar and provided at their outer ends with a longitudinally extending pressure bar 134. Upon the upstanding plates 125 and 126, I have provided a grooved margin bar block 135 held adjustably in position upon said plates 125 and 126 by means of a set screw 136. The device as shown in Figs. 16 and 17 is thus seen to conform substantially to the arrangement as shown in Fig. 8 but with the clamping bar means provided in addition for holding the assembly of sheets to better advantage in position for application to the duplicating pad. In the arrangement shown, the bar 129 is in the form of an angle bar for giving the device the required strength.

In the arrangement shown in Fig. 18, the construction is generally similar to that shown in Figs. 16 and 17. This construction comprises a plate 137 corresponding to the plate 123, such plate 137 being provided with an upstanding plate or flange 138 along its inner edge. The end portions of the plate 138 are bent sidewise to provide arms 139 between which a pin 140 is journaled for supporting a clamping plate 141 by means of sleeve portions 142 engaging said pin. A coiled spring 143 is provided adapted by engagement with the plates 137 and 141 to hold the plate 141 normally in position for pressing at its inner edge upon the plate 137. Along the inner edge of the plate 137, I have provided a scale 144 graduated to conform with the spacing of the rack bar 58 by which the step by step movement of the carriage of the machine is controlled.

Figures 9, 10:
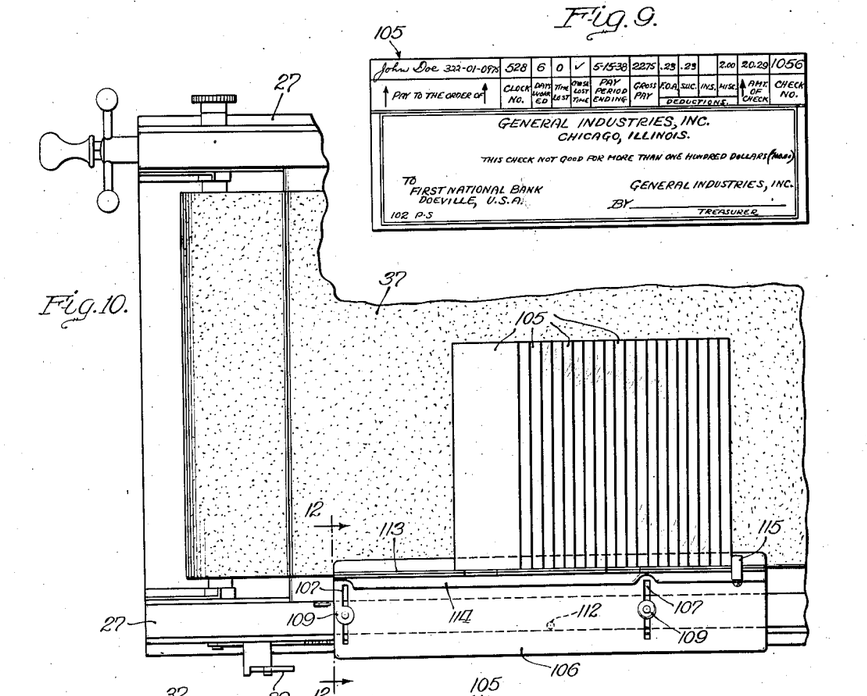
Fig. 9 is a face view of one of the checks making up the unit assembly of checks as shown in Fig. 10.
Fig. 10 is a view similar to a portion of Fig. 1 but showing a modified form of structure.
Figure 11:
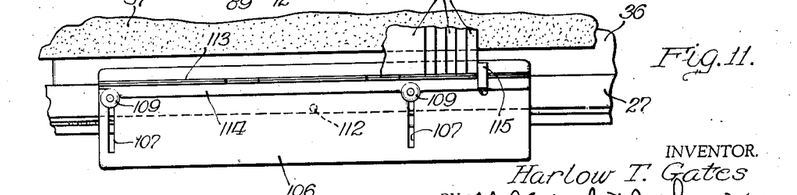
Fig. 11 is a view similar to a portion of Fig. 10 but showing a changed position of the side margin bar means.

By the use of my improved arrangement, an operator is enabled to provide a plurality of copies by the use of a unit assembly of copy sheets as shown in Fig. 10, such result being attained more easily and more expeditiously than has been possible by the use of prior constructions, such result being attainable by the use of the type of machine as shown by which copy sheets are alternatively enabled to be presented one at a time for single line printing in connection with the production of individual record sheets as above described.

While I prefer to employ the form and arrangement of parts as shown in my drawings and as above described, it is to be understood that my invention is not to be limited to such form and arrangement except so far as the claims may be so limited.

I claim:

1. A flat bed duplicating machine of the hectograph type, comprising in combination a frame, a bed mounted on said frame and provided with means for holding a duplicating pad thereon, margin stop means comprising a plate resting at its outer edge on the side portion of said frame so as to extend at its inner edge portion over a duplicating pad positioned on said bed, and upstanding margin bar means carried by said plate in position to overlie the side edge portion of said duplicating pad, and means connecting said plate releasably with said frame and arranged for the plate to be in close proximity to the duplicating pad for enabling said upstanding margin bar means to control the position of a copy sheet transversely of the bed.

2. A flat bed duplicating machine of the hectograph type, comprising in combination a frame, a bed mounted on said frame and provided with means for holding a duplicating pad thereon, and a margin stop unit removably mounted on said frame at one side thereof having stop means adapted by engagement with a copy sheet to control the positioning of said copy sheet transversely of the duplicating pad and having other stop means adapted by engagement with the copy sheet to control the positioning of the copy sheet longitudinally of the duplicating pad.

3. A flat bed duplicating machine of the hectograph type, comprising in combination a frame, a bed mounted on said frame and provided with means for holding a duplicating pad thereon, a master sheet assembly comprising a plurality of master sheets in overlapping position with a series of lines of subject matter in regularly spaced relation to each other, and margin stop means removably mounted on said frame at one side edge portion of the bed so as to extend longitudinally of the machine adapted by engagement with edge portions of the master sheet assembly to control the positioning of said master sheet assembly on said duplicating pad transversely of the machine and adapted thereafter in like manner to enable the operator to position in corresponding relation a copy sheet assembly comprising a plurality of copy sheets in overlapping relation to each other.

4. A flat bed duplicating machine of the hectograph type, comprising in combination a frame, a bed mounted on said frame and provided with means for holding a duplicating pad thereon with the copy subject matter arranged in transversely extending lines in regularly spaced relation to each other longitudinally of the bed, means movable over said pad and arranged to be stopped at regularly spaced positions along said bed for positioning a copy sheet in impression relationship to the several lines of subject matter on said duplicating pad, and margin stop means removably mounted on said frame adapted by engagement with a different copy sheet used alternatively to control the positioning of said other copy sheet in effective relationship with the subject matter on the duplicating pad.

5. A flat bed duplicating machine of the hectograph type, comprising in combination a frame, a bed mounted on said frame and provided with means for holding a duplicating pad thereon with the copy subject matter arranged in transversely extending lines in regularly spaced relation to each other longitudinally of the bed, a carriage movable step by step over said bed and having margin bar means adapted by engagement with copy sheets to position such sheets on said carriage in such position as to cause their copy receiving portions to register with the respective lines of said subject matter on the duplicating pad when the carriage stands at its several adjusted positions, and margin bar means removably mounted on said frame adapted by engagement with other copy sheets used alternatively to control the position of said other copy sheets in effective relationship with the subject matter on the duplicating pad.

6. A flat bed duplicating machine of the hectograph type, comprising in combination a frame, a bed mounted on said frame and provided with means for holding a duplicating pad thereon, a plate removably mounted on one side edge portion of said bed, upstanding margin bar means carried by said plate for controlling the position of a copy sheet on the bed transversely of the bed, and other means adjustable longitudinally of said bed for controlling the position of said copy sheet longitudinally of the bed.

7. A flat bed duplicating machine of the hectograph type, comprising in combination a frame, a bed mounted on said frame and provided with means for holding a duplicating pad thereon, a plate removably mounted on one side edge portion of said bed, a second plate portion in substantially vertical position longitudinally of said first-named plate for controlling the position of the copy sheet on the bed transversely of the bed, and a margin stop device in the form of a block adjustable longitudinally of said second plate for controlling the position of said copy sheet longitudinally of the bed.

8. A flat bed duplicating machine of the hectograph type, comprising in combination a frame, a bed mounted on said frame and provided with means for holding a duplicating pad thereon, a plate having a pair of pins extending downwardly therefrom in position to engage openings in the top face of a frame bar at one side of the machine for holding the plate removably in position longitudinally of the bed at one side thereof, upstanding margin bar means carried by said plate for controlling the position of a copy sheet transversely of the bed, and other means adjustable longitudinally of said plate for controlling the position of said copy sheet longitudinally of the bed.

9. A flat bed duplicating machine of the hectograph type, comprising in combination a frame, a bed mounted on said frame and provided with means for holding a duplicating pad thereon, a plate having a pair of pins extending downwardly therefrom and adjustable transversely of the plate adapted by engagement with openings in the frame at one side thereof to hold said plate removably in position so as to be adjustable transversely of the machine, upstanding margin bar means carried by said plate for controlling the position of a copy sheet transversely of the bed, and other means adjustable longitudinally of the plate for controlling the position of said copy sheet longitudinally of the bed.

10. A flat bed duplicating machine of the hectograph type, comprising in combination a frame, a bed mounted on said frame and provided with means for holding a duplicating pad thereon, a plate adapted to be removably mounted in position along one side of the bed and having slots positioned transversely of the plate, pins extending through said slots and held in adjusted position therein by nuts secured by screw threads on the upper ends of the pins and adapted by engagement with openings in the frame at one side to hold the plate removably in position so as to be adjustable transversely of the machine, upstanding margin bar means carried by said plate for controlling the position of the copy sheet transversely of the bed, and other means adjustable longitudinally of the plate for controlling the position of said copy sheet longitudinally of the bed.

11. A flat bed duplicating machine of the hectograph type, comprising in combination a frame, a bed mounted on said frame and provided with means for holding a duplicating pad thereon, a plate removably mounted on one side edge portion of said bed, upstanding margin bar means carried by said plate for controlling the position of a copy sheet on the bed transversely of the bed, a rod adjustably mounted on said plate longitudinally thereof, means for locking said rod releasably in adjusted position, and a transversely positioned margin bar member mounted on said rod so as to control the positioning of a copy sheet longitudinally of the bed.

12. A flat bed duplicating machine of the hectograph type, comprising in combination a frame, a bed mounted on said frame and provided with means for holding a duplicating pad thereon, a plate removably mounted on one side edge portion of said bed so as to extend longitudinally of the machine, a second plate movably mounted on said first-named plate in position to cooperate with said first-named plate for gripping a plurality of sheets arranged in overlapping relation and extending transversely of the machine, and yielding means normally urging said second plate toward said first-named plate for holding said plurality of overlapping sheets in position on said duplicating pad.

13. A flat bed duplicating machine of the hectograph type, comprising in combination a frame, a bed mounted on said frame and provided with means for holding a duplicating pad thereon, a plate removably mounted on one side edge portion of said bed so as to extend longitudinally of the machine, a second plate pivotally mounted on an axis extending longitudinally of said plates in position to cooperate with said first-named plate for gripping a plurality of sheets arranged in overlapping relation and extending transversely of the machine, and spring means normally urging said two plates together for releasably holding said plurality of overlapping sheets in position on said duplicating pad.

HARLOW T. GATES.